Nov. 14, 1967 A. B. LINDQUIST 3,353,160

TREE PRIORITY CIRCUIT

Filed June 9, 1965 4 Sheets-Sheet 1

INVENTOR
ARWIN BRUCE LINDQUIST

BY Carl C. Kling

ATTORNEY

Nov. 14, 1967 A. B. LINDQUIST 3,353,160

TREE PRIORITY CIRCUIT

Filed June 9, 1965 4 Sheets-Sheet 4

United States Patent Office 3,353,160

Patented Nov. 14, 1967

3,353,160

TREE PRIORITY CIRCUIT

Arwin Bruce Lindquist, Poughkeepsie, N.Y., assignor to International Business Machines Corporation, Armonk, N.Y., a corporation of New York Filed June 9, 1965, Ser. No. 462,652
9 Claims. (Cl. 340—172.5)

This invention relates to circuits for determining the priority relationship of a number of input signals and particularly to a priority circuit of the tree configuration.

The function of a priority circuit is to accept inputs from a number of input signal sources and to place those inputs into an acceptable sequence. The priority circuit must guard against the possibility of several input signals arriving at the same time and thus must be capable of assigning priority properly to the signals currently available as of a certain time. The priority circuit must be reasonably fast and economical to operate.

CHARACTERISTICS OF THE INVENTION

*Environment*

The tree priority circuit of the invention operates conveniently in the environment of a real time computer system. In such a computer system, various demands for the computer's data processing capability occur from time to time, in no fixed relationship. These demands must be controlled either by prearrangement or by a priority system in such fashion that they do not exceed the capability of the computer system to respond to their requirements. Demands for processing time on the computer occur as a result of external stimuli. Such stimuli may occur in such fashion that several demands are made at the identical time to the computer. As an example there might be a demand by a human operator via a console; a demand by a tape unit which is providing data; a demand by a tape unit which is accepting data; and a demand from a card punch which is ready to punch the next card. Some of these demands, particularly the tape unit demands, are such that they must be processed immediately. Other demands such as the operator at the console can be processed at a slightly later time. Priority might be assigned as follows:

(1) The tape unit providing data.
(2) The tape unit accepting information.
(3) The card punch requiring data.
(4) The human operator at the console.

A convenient solution to the problem is the use of a directory unit to provide an automatic sequence of priority to the various demands. Such a priority unit requires a logical device which can respond to the occurrence of demand signals, in real time, in bursts of up to the total capacity of the unit, and provide go-ahead signals according to a prearranged priority.

*Function*

The priority circuit locates the first "1" bit in a binary register. Such a circuit is sometimes called the "leftmost 1" circuit, because it can be used to eliminate non-significant high order zeros in an arithmetic operation. Priority circuits are also used to assign go-ahead signals to various interrupt demands in computer systems. Priority circuits are also useful in directing incoming words to vacant registers in an associative memory.

*State of the art*

A simple priority system is the delay line, a first-in-first out priority arrangement. Such a system, however, suffers from the possibility of a multiple coincident demand in which some means must be provided to allocate these simultaneous demands in time. It also suffers in its inability to give preference to the more urgent demands.

Another priority system is an indicator scan arrangement in which each demand turns on an indicator. The indicators are arranged to be scanned by the computer. During each cycle of demand response the computer checks an indicator to determine whether that indicator requires a go-ahead. Various arrangements have been made to expedite such an indicator scan, such as by scanning in groups. Even so, the indicator scan tends to be relatively slow.

Solely logical priority circuits have been developed. Such priority circuits are normally in a configuration which may be characterized as a "ladder"; in the configuration, logic is provided which is essentially an electronic scan. The highest priority signal position (position 1) is arranged to be connected directly through as its own go-ahead signal; the next highest priority position (position 2) is arranged to be connected directly through to go-ahead if the highest order signal position is in the not-go-ahead condition. Position 3 is arranged to be connected directly through to go-ahead if it receives a demand signal accompanied by the not-go-ahead signal from position 2; and so on. Each demand position responds to the presence of its demand and the absence of its next higher order go-ahead. Such a ladder configuration becomes relatively slow at the lower order positions, because of the time required to ripple through the higher orders.

*Objects*

It is an object of the invention to provide a simpler and more efficient priority circuit.

A second object of the invention is to provide a priority circuit in tree configuration.

A further object of the invention is to provide a priority circuit in which there is no requrement for a logical ripple.

*Features*

A feature of the invention is a generalized tree priority circuit in which a single circuit configuration or module can be connected in multiples to provide a tree priority circuit of major size.

Another feature of the invention is the provision for immediate priority allocation in parallel by connecting each demand signal in logical "and" with the complements of all its higher priority demand signals.

*Advantages*

An advantage of the invention is its high speed and relatively low cost. Another advantage of the invention is its modularity which enables a single circuit package to be connected in multiples to provide a priority circuit of the exact size.

The foregoing and other objects, features and advantages of the invention will be apparent from the following more particular description of a preferred embodiment of the invention as illustrated in the accompanying drawings.

*Drawings*

FIGURE 4 is a complement in, true out circuit.

FIGURE 5 is a true in, complement out circuit.

FIGURE 6 is a true in, true out circuit.

FIGURE 7 is a complement in, complement out circuit.

SUMMARY—FIGURES 1 AND 3

The invention is a modular tree priority circuit. The tree priority circuit accepts a random pattern of priority demand signals in parallel and provides priority go-ahead signals based upon priority position of the demand signals rather than time of their arrival.

Priority demand signals A1–A5 are directly connected respectively to a set of go-ahead signal producing logical AND circuits 101–105, and are all connected directly to logical OR circuit 106. The output of OR circuit 106 serves as a module priority demand signal, requesting a go-ahead signal for the modules and an inhibiting signal to all lower ranked modules. The outputs of similar OR circuits of higher priority are applied through higher level modules to provide an inhibiting signal along conductor 111. Each priority demand signal A1–A4 is connected respectively through inverters 107–110 to each of the lower ranked go-ahead AND circuits 102–105 of the module.

A go-ahead signal results if the following three situations exist:

(1) No higher order module is receiving a priority demand signal.

(2) No higher order position within the module is receiving a priority demand signal.

(3) A priority demand signal is applied.

Within the module, there is no logical delay caused by ripple between positions. The whole tree priority circuit is a tree of modules, with two or three higher levels of module and one base level of module. See FIGURE 3.

The logical delay in the whole tree priority circuit is that caused by one OR circuit and one inverter in each level of modules.

Figure 1:
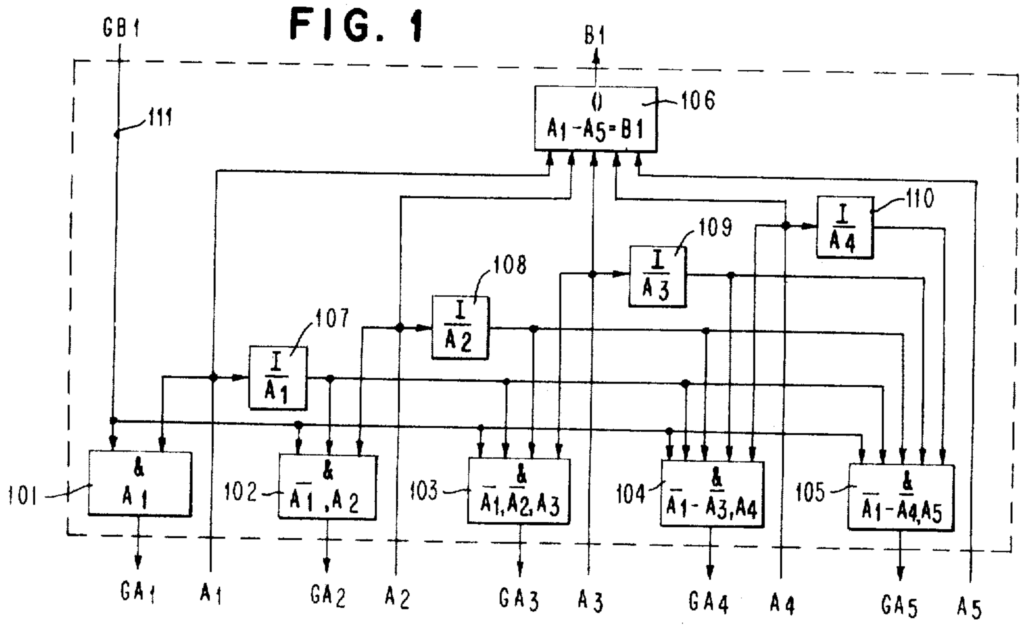
FIGURE 1 is a logical block diagram of the invention.

*Tree priority circuit module—FIGURE 1*

FIGURE 1 shows the makeup of a tree priority circuit module, in an arrangement for logical circuits with up to five inputs. Go-ahead AND circuits 101–105 are each arranged to respond to the presence of their respective priority demand signals A1–A5 in the absence of each of the respectively higher ranked priority demand signals as signaled by inverters 107–110. Module priority demand OR circuit 106 responds to any one of priority demand signals A1 to A5 to provide a signal designatable module priority demand B1. This signal is useful in determining which module should get a module priority go-ahead signal such as GB1. Go-ahead AND circuit 101, for example, responds to the coincidence of signal GB1 and priority demand signal A1 to produce go-ahead signal GA1. Signal GB1 is the module priority go-ahead for the FIGURE 1 module, indicating the absence of a priority demand in any higher ranked module. Demand signal A1 also passes through inverter 107 and is then applied as $\overline{A1}$ (not A1) as an input to each of the higher ranked priority AND circuits 102–105 of the module. Go-ahead AND circuit 102 produces go-ahead signal GA2 in response to the following inputs:

GB1—Module priority go-ahead signal.

$\overline{A1}$—(Not A1) The complement of a priority demand signal in the next higher ranked position within the module.

A2—Priority demand signal for the position.

Go-ahead AND circuit 103 produces go-ahead signal GA3 in response to the following inputs:

GB1—Module priority go-ahead signal.

$\overline{A1}$—The complement of a priority demand signal in the high rank position within the module.

$\overline{A2}$—The complement of a priority demand signal in position 2.

A3—Priority demand signal for the position.

Go-ahead AND circuit 104 produces go-ahead signals GA4 in response to the following inputs:

GB1—Module priority go-ahead signal.

$\overline{A1}$—The complement of a priority demand signal in the next high rank position within the module.

$\overline{A2}$—Complement of A2.

$\overline{A3}$—Complement of A3.

A4—Priority demand for the position.

Go-ahead AND circuit 105 produces go-ahead signals GA5 in response to the following inputs:

GB1—Module priority go-ahead signal.

$\overline{A1}$—The complement of a priority demand signal in the high rank position within the module.

$\overline{A2}$—Complement of A2.

$\overline{A3}$—Complement of A3.

$\overline{A4}$—Complement of A4.

A5—Priority demand for the position. (Presence of this signal indirectly results in producing signal GB1).

Figure 2:
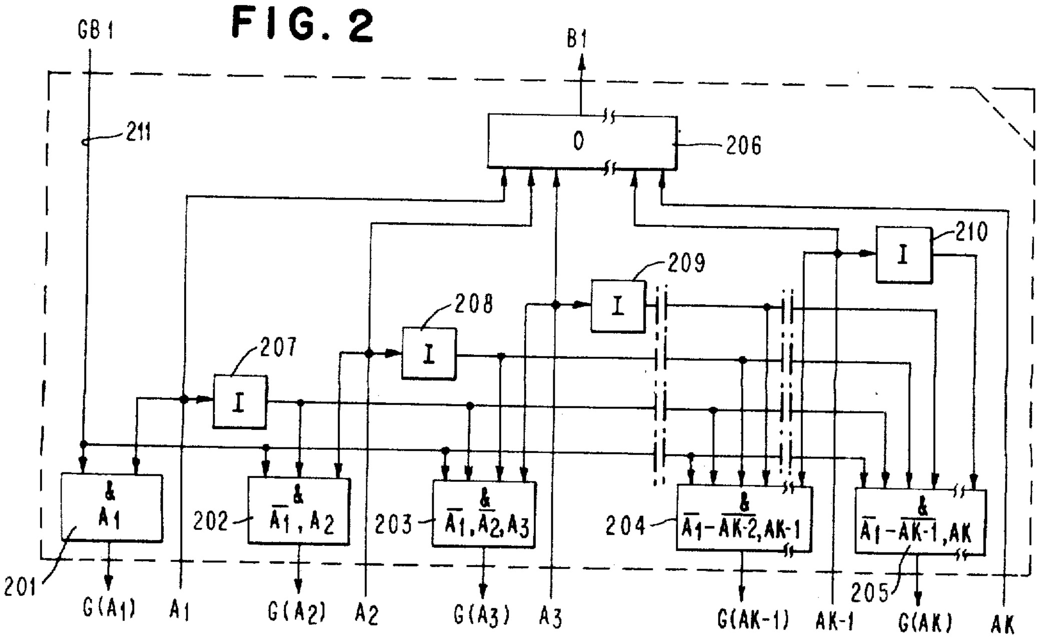
FIGURE 2 is a logical block diagram of a generalized tree priority circuit module.

*Generalized tree priority circuit module—FIGURE 2*

FIGURE 2 shows the makeup of a tree priority circuit module, in an arrangement for logical circuits of up to K inputs, the general case. Go-ahead AND circuits 201–205 are each arranged to respond to the presence of their respective priority demand signals A1–AK in the absence of each of the respectively higher ranked priority demand signals, as indicated by the outputs of inverters 207–210.

Go-ahead AND circuit 201, for example, responds to the coincidence of signal GB1, indicating the absence of any priority demand signal in any higher ranked module, and of priority demand signal A1, to produce go-ahead signal GA1.

Go-ahead AND circuit 202 produces go-ahead signal GA2 in response to the following inputs:

GB1
$\overline{A1}$
A2

Go-ahead AND circuit 203 produces go-ahead signal GA3 in response to the following inputs:

GB1
$\overline{A1}$
$\overline{A2}$
A3

Go-ahead AND circuit 204 produces go-ahead signal GA(K−1) in response to the following inputs:

GB1
$\overline{A1}$
$\overline{A2}$
$\overline{A3}$
$\overline{A(K-2)}$
A(K−1)

Go-ahead AND circuit 205 responds to priority demand signal AK even though the connection is not direct. The priority demand signal passes directly to OR circuit 206, producing module priority demand signal B1. This module priority demand signal results in a module priority go-ahead signal GB1 if the module is highest in rank of modules demanding priority. Module priority go-ahead signal GB1, together with the complements of priority demand signals for all higher ranks, conditions go-ahead AND circuit 205 to provide go-ahead signal GAK.

Figure 3:
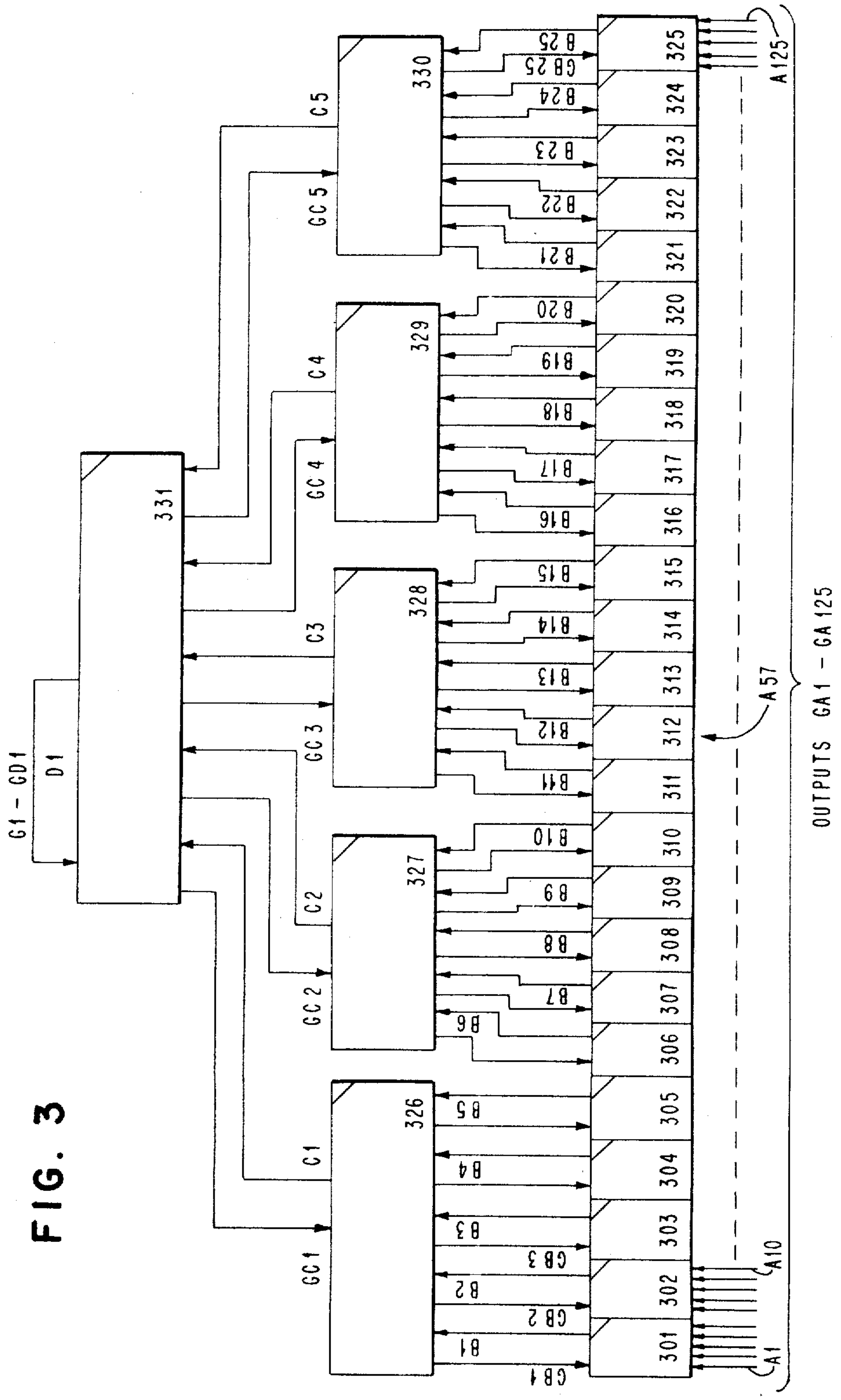
FIGURE 3 is a block diagram of a tree priority circuit.

*Large tree priority circuit—FIGURE 3*

FIGURE 3 shows a large tree priority circuit made up of a group of the modules of FIGURE 2. The modules are arranged in a tree configuration of modules. FIGURE 3 shows a priority circuit for 125 demand inputs, made up of three levels of modules of five positions each. The logic circuits in the modules can accept up to five inputs each.

Twenty-five modules 301–325 form the base level, accepting demand inputs and providing go-ahead signals in 125 positions. The second level includes five modules 326–330, each of which accepts the information that one or more positions of one of a related group of five modules is presenting a demand and provides to all lower ranked positions capability of inhibiting go-ahead outputs.

The third level is a single module 331, which maintains order among the five modules 326–330 in the second level.

Each module is similar to all other modules. The upper level modules accept "module priority demands" from the OR circuits corresponding to OR circuit 106.

*Operation—FIGURES 1 and 3*

The function of the large tree priority circuit is to respond to the occurrence of one or more priority demand signals by providing a go-ahead signal for the highest ranking demand. Assume that a single demand occurs, for example at position 4. Priority demand signal A4 is applied to the fourth input of module 301. This input passes to AND circuit 104 (FIGURE 1) of the module, and to OR circuit 106. The output of OR circuit 106 passes as a "base level module priority demand" signal B1 to module 326. The module priority demand signal B1, applied to the OR circuit 106 of module 326, causes a second level module priority demand signal C1 to be applied to third level module 331. The second level module demand signal C1 is applied to OR circuit 106 of module 331. The output of this OR circuit connects back as an input to the AND circuits including AND circuit 101 of module 331, providing co-incidence of inputs at that AND circuit and causing go-ahead signal GC1 to be generated. This signal GC1 is applied to the AND circuits including AND circuit 101 of module 326, providing coincidence of inputs at that AND circuit and causing go-ahead signal GB1 to be generated. This signal GB1 is applied to the base level go-ahead AND circuits 101–105 of module 301. There is no coincident priority demand signal at any of higher rank AND circuits 101–103. Inverters 107–109 all provide appropriate "not demand" signals. Go-ahead AND circuit 104 is conditioned by a complete coincidence of inputs $\overline{A1}$, $\overline{A2}$, $\overline{A3}$, A4, and GB1. Go-ahead AND circuit 104 thus produces its appropriate output signal GA4.

Other priority demands may occur, with similar handling and results. If however, two priority demand signals are simultaneously presented, only the highest ranked priority demand signal gets the go-ahead.

Assume, for example, that a priority demand signal is presented at position 15 at the same time that another priority demand signal is presented at position 4.

The signal path for position 4 is as stated above. The signal path for position 15, involves modules 303, 326 and 331. Signals B1 and GB1 are present; module 301 go-ahead ANDs are conditioned. Signal B3 is present; module 326 provides signal GB1 but not signal GB3. Module 303 go-ahead ANDs are not conditioned; there is no path for go-ahead signal GA15. Go-ahead AND 105 in module 303 is not fully conditioned. Priority demand signal 4 is higher in rank than priority demand signal 15 and is accordingly processed to output.

Assume that all 125 priority demand signals are simultaneously presented. Each module 301–325 has all inputs conditioned, producing output signals B1–B25. Each module 326–330 has all inputs conditioned, producing output signals C1–C5. Module 331 has all inputs conditioned, and feels signal D1 back to itself.

Signal D1 conditions the go-ahead ANDs 101–105 of module 331. Only go-ahead AND 101, however, produces an output, since its output via inverter 107 deconditions the other go-ahead ANDs 102–105 of the module. Go-ahead AND 101 provides output signal GC1.

Signal GC1 conditions the go-ahead ANDs 101–105 of module 326. Only go-ahead AND 101, however, produces an output, since its output via inverter 107 deconditions the other go-ahead ANDs 102–105 of the module. Go-ahead AND 101 provides output signal GB1.

Signal GB1 conditions the go-ahead ANDs 101–105 of module 301. Only go-ahead AND 101, however, produces an output, since its output via inverter 107 deconditions the other go-ahead ANDs 102–105 of the module. Go-ahead AND 101 provides output signal GA1.

There is no output from any go-ahead AND circuits in modules 302–325 and 327–330 because respective signals GB2–GB25 and GC2–GC5 are not available.

*Input-output requirements—FIGURES 4–8*

FIGURES 4–8 illustrate tree priority circuit modules for use with different inputs and output requirements. The modules are implemented in and-inverter and or-inverter logic.

Figure 4:
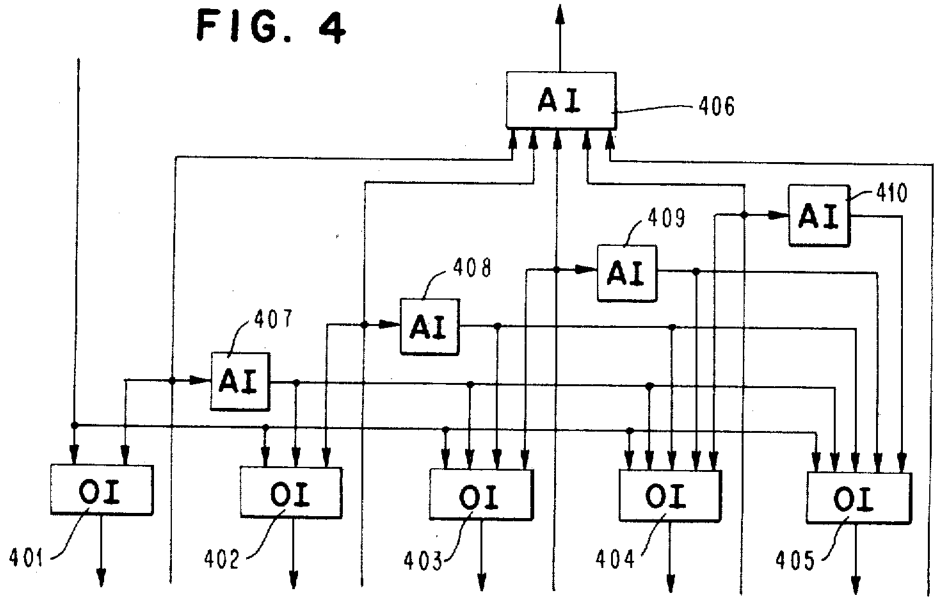
FIGURES 4, 5, 6 and 7 are of schematic block diagrams of tree priority circuit modules, arranged to fit various input and output circuit requirements.

The module shown in FIGURE 4 uses or-inverter circuits 401–405 for the go-ahead output level, and and-inverter circuits 406–410 elsewhere. It accepts complement priority demand signals and provides true output signals.

Figure 5:
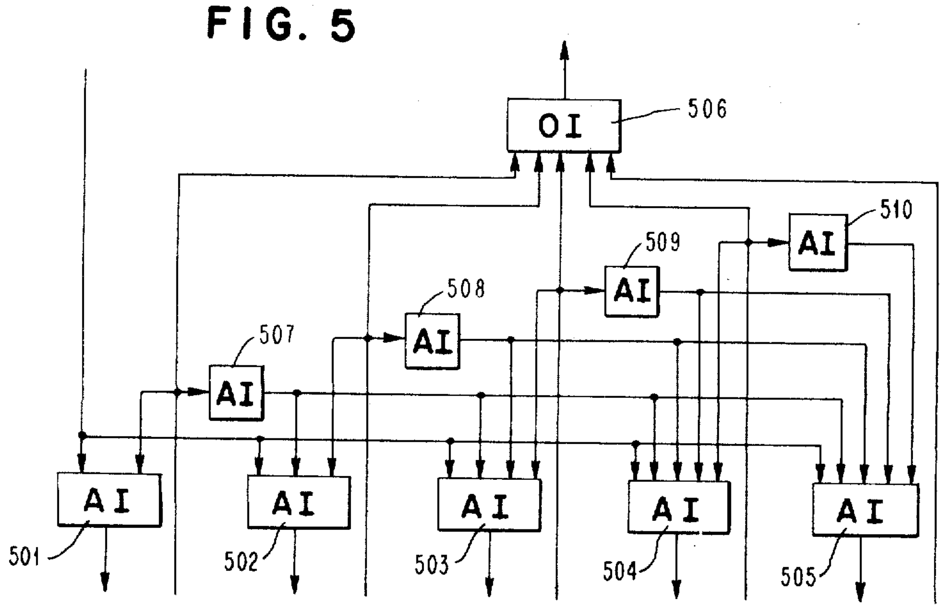

The module shown in FIGURE 5 uses and-inverter circuits 501–510 throughout, with the exception of or-inverter circuit 506 for the module priority demand signal. It accepts true priority demand signals and provides complement output signals.

Figure 6:
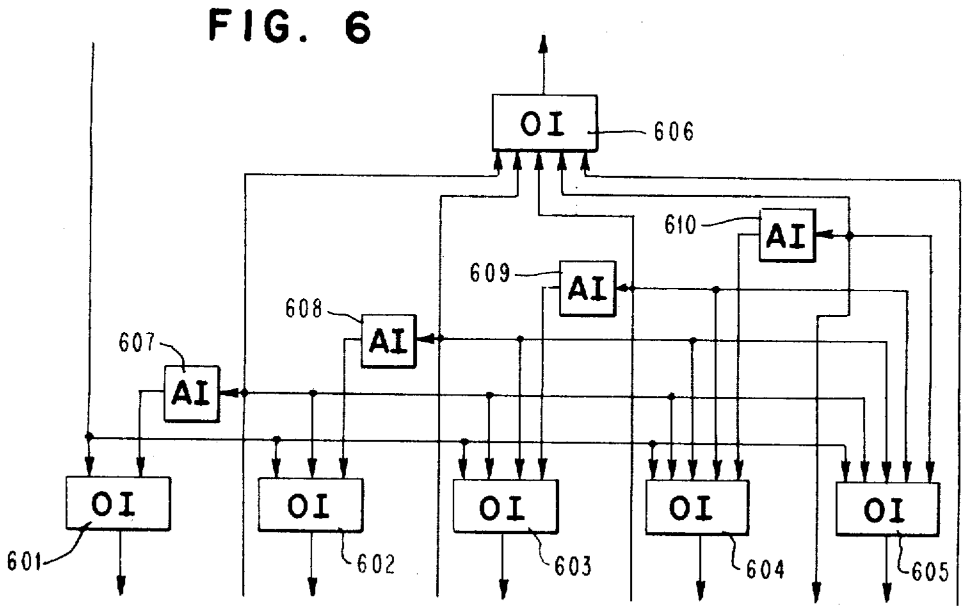

The module shown in FIGURE 6 uses or-inverter circuits 601–606 and and-inverter circuits 607–610. It accepts true priority demand signals and provides true output signals.

Figure 7:
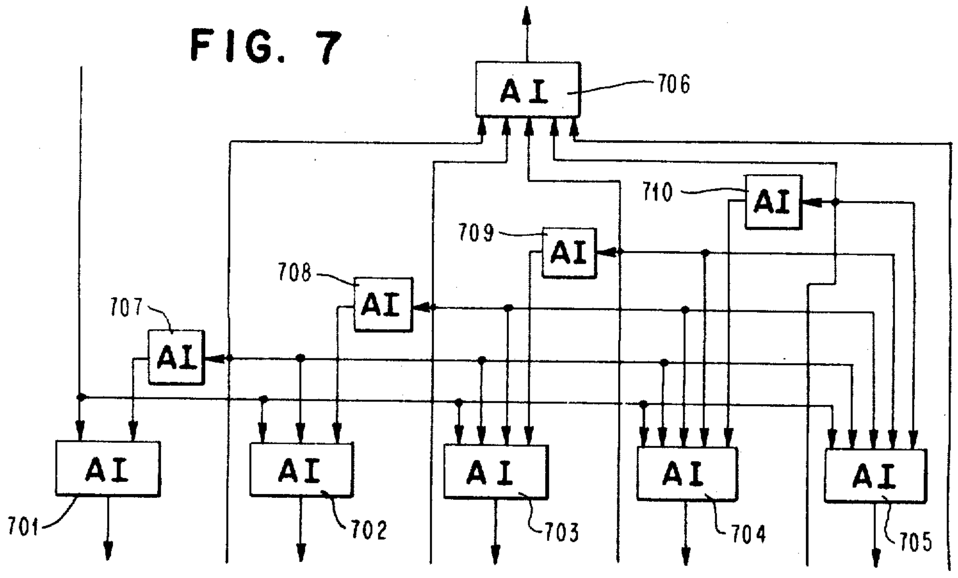

The module shown in FIGURE 7 uses and-inverter signals throughout. It accepts complement priority demand signals and provides complement outputs.

The module can also be implemented in other types of logic circuits to handle various input and output requirements.

CONCLUDING SUMMARY

The invention is a modular tree priority circuit, which accepts a random pattern of parallel priority demand signals and provides a go-ahead signal corresponding to the priority demand of highest rank.

Each tree priority circuit module includes a group of logic circuits for combining the priority demand inputs signals with go-ahead signals for the module, and includes a logic circuit to serve as a priority demand signal for the module. The modules are then arranged in a tree of modules, each module demanding priority according to its rank and the priority demand signals applied to it. The module priority demand signals are logically processed to develop a module priority go-ahead signal for the highest rank module currently active. The module priority go-ahead signal is combined in the module with the original priority demand signal and with the complements of higher rank priority demand signals to produce the final priority go-ahead signal for the highest rank priority demand.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A tree priority circuit comprising:

a plurality of tree priority circuit modules arranged in a tree configuration having a plurality of levels including a first level and at least one additional level, each level having significantly fewer modules than the previous level, all modules being identical, each said module comprising a module priority go-ahead signal input terminal, a plurality of individually ranked priority demand input terminals and go-ahead signal output terminals;

a source of priority demand signals which may be characterized as having positions in a hierarchy of rank;

means connecting said source of priority demand signals to said priority demand input terminals of the modules forming said first level;

means connected to all of said priority demand signal input terminals for providing at a module priority demand signal output terminal an output signal whenever any one of said priority demand signals is present;

means connected to said priority demand signal input terminals of said module and to said module priority go-ahead signal terminal of said module for providing an output at a selected one of said go-ahead signal terminals related to the highest ranked priority demand signal available.

2. A tree priority circuit module, having a plurality of priority demand input terminals and a plurality of output terminals, for providing output signals in response to a predetermined pattern of priority demand signals applied to said input terminals, comprising:

(a) a plurality of first logic circuits, each having a plurality of inputs and a go-ahead signal output, each of said first logic circuits having an assigned position in a ranked hierarchy; and each being associated with an individual one of said priority demand input terminals;

(b) a plurality of inverters associated respectively with each of said first logic circuits except the lowest rank logic circuit;

(c) means connecting each priority demand input to first input terminals of its associated first logic circuits and to the input terminal of its associated inverter;

(d) means connecting the output terminal of each of said inverters to a second input terminal of all of said first logic circuits of lower rank than the inverter's associated logic circuit;

whereupon each of said first logic circuits is deconditioned if any of the higher rank first logic circuits of the module are conditioned with a priority demand signal input;

(e) a second logical circuit having a plurality of input terminals and an output terminal;

(f) means connecting the first input terminal of each of said first logic circuits except the lowest rank of said first logic circuits to the input terminals of said second logical circuit;

(g) means connecting another input terminal of said second logic circuit to the priority demand input terminal, related to but not connected to the one of said first logic circuits having lowest rank;

whereby said second logical circuit provides an output signal when any one of said priority demand input terminals is energized;

(h) and means connecting a last one of said input terminals to an input of each of said first logic circuits;

whereby said last one of said input terminals controls all of said first logical circuits.

3. A tree priority circuit module for use with circuit families providing fan in of $k$, comprising:

(a) $k+2$ terminals designatable "module priority demand" output terminal, "module priority go-ahead" input terminal, "priority demand" terminals 1 through $k$;

(b) $k$ first logic circuits designated in an order of rank first-logic-circuit 1 to first-logic-circuit $k$, each having up to $n$ inputs and an output;

(c) $k-1$ inverters designatable inverter 1 to inverter $k$-1, related respectively to said first logic circuits with the exception of said first logic circuit $k$, each having input and output terminals;

(d) a second logic circuit having $k$ input terminals and an output terminal;

(e) means providing a source of up to $k$ priority demand signals, which signals are assignable to positions of rank for priority purposes which correspond to the order of rank of said first logic circuits 1 through $k$;

(f) means connecting said means providing a source of priority demand signals in parallel to said second logic circuit whereby said second logic circuit provides an output signal indicative of a priority demand signal applied to the module;

(g) means connecting said means providing a source of priority demand signals individually to the respectively related ones of said first logic circuits 1 through $k$ and to the input terminals of the respectively related inverters 1 through $(k-1)$;

(h) means connecting the output terminal of each of said inverters 1 through $(k-1)$ to the input terminals of each of the lower ranking first logic circuits 2 through $k$;

whereby a priority demand signal applied to any input terminal 1 through $k$ results in the preconditioning of the related first logic circuit and the deconditioning via the related inverter of all lower ranked first logic circuits of the module; and (i) means connecting said terminal designatable "module priority go-ahead" input terminal to the inputs of each of said first logic circuits designatable 1 through $k$;

whereby any first logic circuit which is preconditioned by a priority demand signal is conditioned to provide a signal to the related one of said terminals designatable "priority go-ahead" terminal.

4. A tree priority cricuit according to claim 3, wherein said first logic circuits are AND inverter circuits and said second logic circuits are OR inverter circuits.

5. A tree priority circuit according to claim 3 wherein said first logic circuits are OR inverter circuits, and said second logic circuits are AND inverter circuits.

6. A tree priority circuit according to claim 3 wherein said first logic circuits are OR inverter circuits and said second logic circuits are OR inverter circuits.

7. A tree priority circuit according to claim 3 wherein said first logic circuits are AND inverter circuits and said second logic circuits are AND inverter circuits.

8. A tree priority circuit according to claim 3 wherein $k$ equals 5.

9. A tree priority circuit comprising a plurality of like priority modules in higher and lower levels of the tree, each module of a level of the tree having a module priority ranking order, each module adapted to respond to a highest priority demand signal of a plurality of such signals, each module including logical circuits arranged to respond to the presence of a priority demand signal and the absence of each of respectively higher ranked priority demand signals to generate a go-ahead signal corresponding to the priority demand signal signifying that the priority demand signal is of the highest priority;

and a further circuit adapted to respond to any one of the priority demand signals and to generate in response thereto a module priority demand signal, said tree priority circuit comprising:

a plurality of lower level modules arranged in priority order in a lower level and a plurality of like higher level modules adapted to respond to module priority demand signals from said lower level modules;

the module priority demand outputs of the lower level of modules being fed to the higher level of modules as priority demand inputs and means for utilizing the go-ahead signal of a higher level module to energize the logical circuits of the lower level module supplying the module priority demand input.

References Cited

UNITED STATES PATENTS 2,923,475 2/1960 Ketchledge ---------- 235—175

MALCOLM A. MORRISON, *Primary Examiner.*

K. MILDE, *Assistant Examiner.*

UNITED STATES PATENT OFFICE

CERTIFICATE OF CORRECTION

Patent No. 3,353,160 November 14, 1967

Arwin Bruce Lindquist

It is hereby certified that error appears in the above numbered patent requiring correction and that the said Letters Patent should read as corrected below.

Column 7, line 60, strike out "but not connected to".

Signed and sealed this 31st day of December 1968.

(SEAL)
Attest:

Edward M. Fletcher, Jr.
Attesting Officer

EDWARD J. BRENNER
Commissioner of Patents